United States Patent [19]
de Boer
[11] 3,879,748
[45] Apr. 22, 1975

[54] COMPENSATION OF TIMING ERRORS IN A COLOR VIDEO SIGNAL

[75] Inventor: Jacob De Boer, Emmasingel, Eindhoven, Netherlands
[73] Assignee: U.S. Philips Corporation, New York, N.Y.

[22] Filed: July 11, 1973
[21] Appl. No.: 378,266

[30] Foreign Application Priority Data
July 26, 1972 Netherlands ........................ 7210324

[52] U.S. Cl. .......................................... 358/8; 360/36
[51] Int. Cl. ............................................ H04n 5/76
[58] Field of Search.... 178/6.6 TC, 5.4 CD, 69.5 R, 178/69.5 TV; 358/8, 9, 4, 17, 31, 80; 360/36, 37, 8, 9

[56] References Cited
UNITED STATES PATENTS

| | | | |
|---|---|---|---|
| 2,988,593 | 6/1961 | Olive | 178/6.6 |
| 3,384,707 | 5/1968 | Bopp et al. | 178/6.6 |
| 3,419,681 | 12/1968 | Bopp et al. | 178/6.6 |

*Primary Examiner*—Robert L. Griffin
*Assistant Examiner*—R. John Godfrey
*Attorney, Agent, or Firm*—Frank R. Trifari; Simon L. Cohen

[57] ABSTRACT

A device for the compensation of timing errors in a color video signal which is derived from a record carrier, and in which the chrominance information and the luminance information cover two different frequency bands. The chrominance information is applied to a first shift register and the luminance information to a second shift register, the information contained in the upper frequency band being previously transformed to a lower frequency range. The two shift registers receive a clock signal which is derived from the same control signal. The number of elements of which the first shift register consists may be smaller than the number of elements of the second shift register; the divisor of the divider stage should then equal the ratio of the number of elements of the two shift registers.

4 Claims, 6 Drawing Figures

COMPENSATION OF TIMING ERRORS IN A COLOR VIDEO SIGNAL

Figure 1:
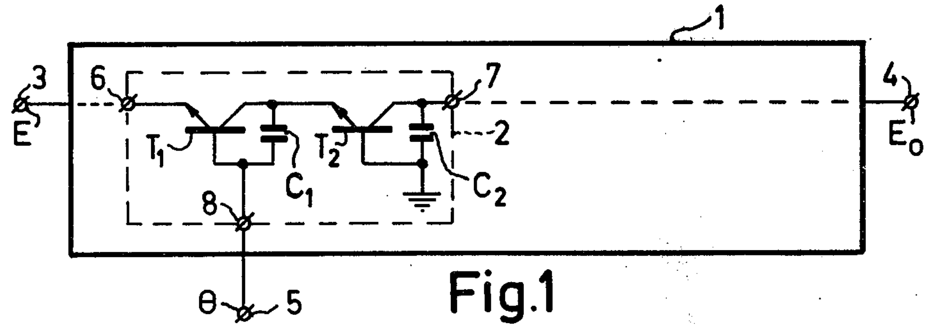

The invention relates to a device for the compensation of timing errors in a color video signal which is derived from a record carrier, specifically a color video signal whose chrominance information and luminance information are recorded on the record carrier in two different frequency bands. The device utilizes a variable delay line which consists of a shift register. The shift register comprises a group of series-connected elements. The transfer or information from one element to the next is controlled by a clock signal, which is fed to a clock input of the shift register. The frequency of the clock signal is determined by a control signal, which is obtained by comparing a synchronizing signal that is in synchronism with the color video signal and a reference signal.

Such devices are of particular interest in the reproduction of color video signals which are recorded on a record carrier in the form of a tape. Owing to tape stretch variations, tape speed variations, variations of the head disc speed and the like, relatively large deviations from the time base of the reproduced signal may result when this recording method is used. The other recording methods, for example optical or magnetic recording on a disc, may also give rise to errors in the timing of the reproduced signal, for example, owing to speed variations. While this may give rise to a quality deterioration even in the reproduction of black-and-white pictures, in the reproduction of color pictures the effect of these errors is appreciably greater owing to the required phase stability of the color information.

In the known recording devices attempts are made to prevent said errors in the timing of the reproduced signal by utilizing servo systems which, for example in the case of record carriers in the form a tape, control both the tape speed and the speed of rotation of the head disc. However, as a result of their relatively long response time, such servo systems are merely capable of compensating for relatively slow variations of the time base. Consequently, the residual timing errors must be compensated for in a different manner.

The use of variable delay lines for this purpose is known. By measuring the timing error and accordingly adjusting the delay caused by the delay line so as to compensate for this, this deviation can be eliminated with a high degree of accuracy. As the operation of this system is fully electronic, this does enable rapid variations of the time base to be compensated for.

As a variable delay line for this application it is advantageous to use shift registers which consist of a group of series-connected elements, the transfer of information from one element to the next being controlled by a pulse of a clock signal consisting of a pulse train. By varying the pulse repetition rate of this clock signal the delay time can be varied. Such shift registers, in particular the analogue shift registers, such as bucket-brigades, CCD's (charge-coupled devices) and SCT's(surface charge transistors) are known in several modifications and have already been proposed for this application. Although it is also possible to use digital shift registers by employing AD/DA converters, only the use of analogue shift registers, i.e. shift registers that are capable of processing analogue signals, will be discussed hereinafter.

Two features determine the number of elements of which such an analogue shift register should consist. One feature is the maximum time base error to be compensated for by the shift register and the other is the frequency range over which the pulse repetition rate of the clock signal can be varied. The maximum clock frequency which is possible is determined by the technology used in the manufacture of the shift register. The minimum permissible clock frequency is determined by the highest frequency of the signal applied to the shift register. This is because in these shift registers the signal is sampled with the clock frequency as a sampling frequency. As this sampling frequency should be at least twice the maximum frequency occurring in the signal in order to ensure a distortion-free transfer of the signal, this means that the minimum clock frequency should also be at least twice said frequency.

Generally, it is attempted to minimize the number of elements of which such a shift register consists. Each element causes a certain signal attenuation, so that the signal-to-noise ratio deteriorates as the number of elements increases. Therefore, if a simple shift register with a relatively high attenuation per element is to be used, the number of elements of the shift register is to be minimized. For a certain maximum time-base error this means that the frequency range of clock frequency is to be made as large as possible. However, this requirement is in conflict with the requirement that a simple delay line is to be used, which generally also has a relatively low upper frequency limit, which determines the maximum clock frequency. Consequently, one should always aim at a compromise between these two conflicting requirements.

It is an object of the invention to obviate the aforementioned problems. The invention particularly concerns the compensation of time base errors in color video signals, in which the chrominance information and the luminance information cover two different frequency bands.

The invention is characterized in that the device comprises a first and a second shift register, that the chrominance information is fed to the first shift register and the luminance information to the second shift register, the information contained in the upper one of the two frequency bands being previously transformed to a lower frequency band and the two clock signals for the two shift registers being derived from said control signal.

The measure according to the invention increases the attainable frequency sweep of the clock frequency for each of the shift registers used, so that the minimum permissible clock frequency is smaller than when a single shift register is used. This implies that the number of elements of each shift register can be smaller so that the attenuation of each shift register decreases. If desired, the maximum clock frequency may also be reduced, i.e. a semiconductor technology may be applied with a lower upper frequency limit.

In a preferred embodiment of the device according to the invention the number of elements of the first shift register is made smaller than the number of elements of the second shift register and the clock signal for the first shift register is derived from the clock signal for the second shift register via a divider stage, the divisor realized by said divider stage being equal to the quotient of the number of elements of the two shift registers. Preferably, this divisor is then made equal to the quotient of the minimum widths required for the frequency bands of the luminance and chrominance information.

In these preferred embodiments an effective use is made of the fact that the chrominance information generally covers an appreciably smaller frequency band than the luminanace information. Owing to this further measure according to the invention a further reduction of the number of elements of the first shift register is attained, while at the same time ensuring that the two shift registers always introduce the same delay time.

The invention will now be described in more detail, by way of example, with reference to the Figures, of which FIG. 1 schematically shows an embodiment of a variable delay line as used in the device according to the invention.

Figure 2:
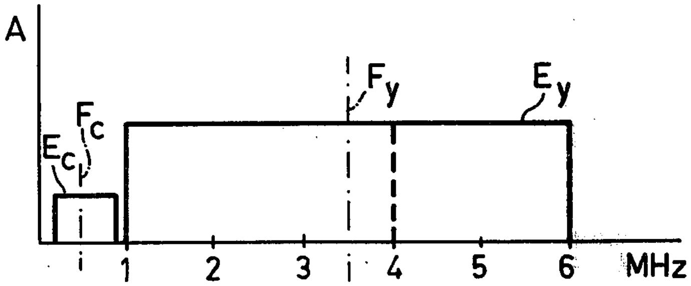

FIG. 2 shows a spectrum of a video signal as it is recorded on the record carrier in a number of recording devices and as it is applied to the device according to the invention.

Figure 3:
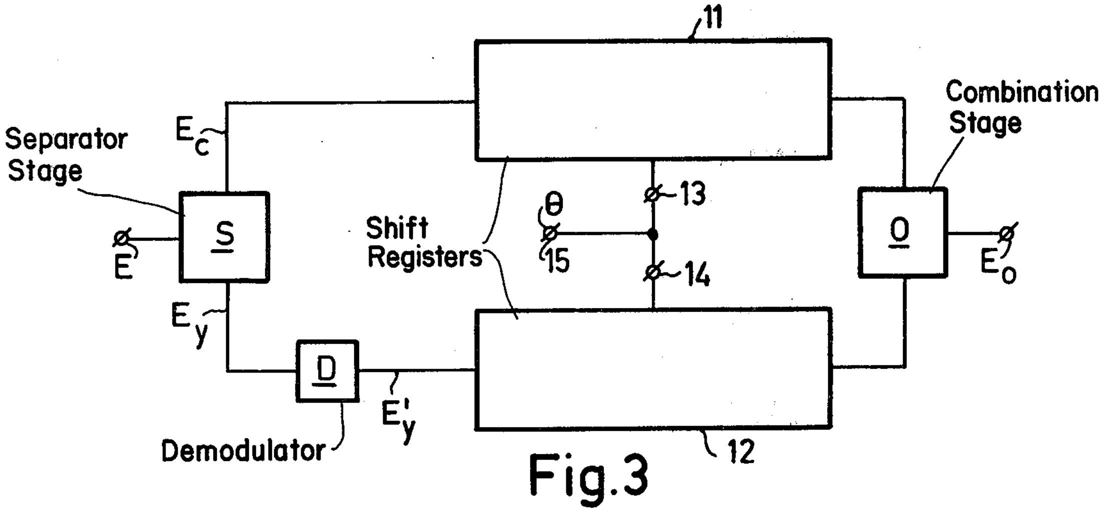
Figure 4:
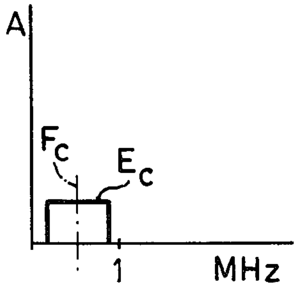
Figure 5:
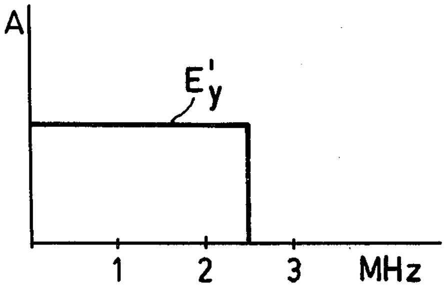

FIG. 3 schematically shows a first embodiment of the device according to the invention, and FIGS. 4 and 5 show partial spectrums of the associated chrominance and luminance information.

Figure 6:
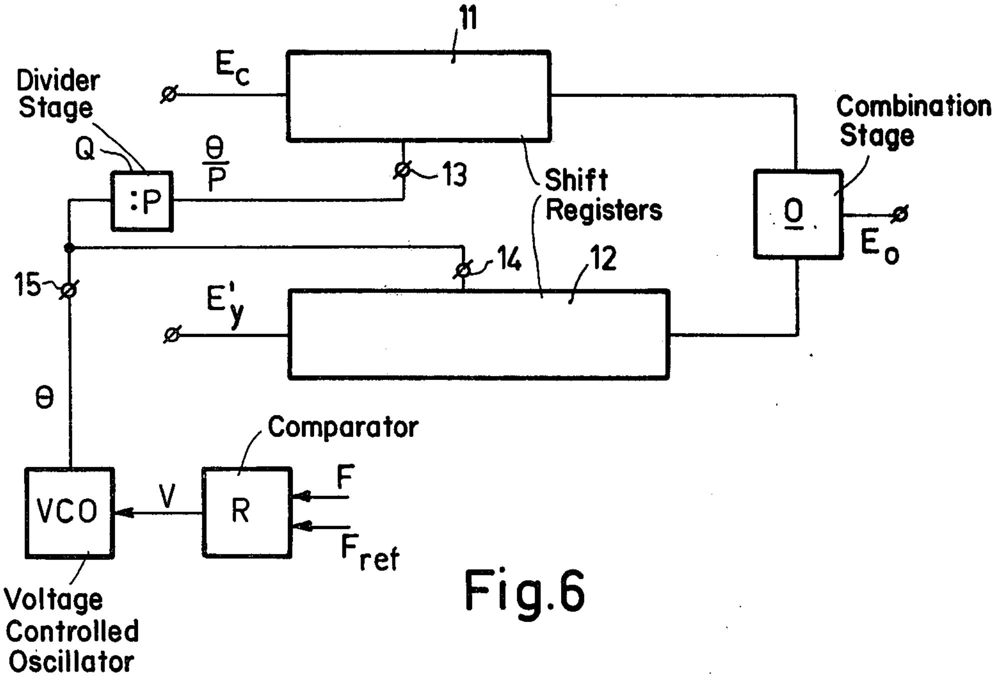

FIG. 6 finally shows a preferred embodiment of the device according to the invention.

The delay line which is schematically shown in FIG. 1 is an example of an analogue shift register, specifically of a bucket-brigade store. It is to be noted that the device according to the invention may equally employ a shift register of a different design, so that the arrangement shown in FIG. 1 should be considered merely as an example.

The shift register 1 has an input terminal 3 to which the signal E is applied and an output terminal 4 from which the delayed signal $E_o$ is taken. Between said input terminal 3 and output terminal 4 this shift register 1 includes a number of series connected elements 2, only one of which is shown. Each element 2 has an input 6 and an output 7, which via the series connected emitter-collector paths of two npn-transistors $T_1$ and $T_2$ are interconnected. The base-collector paths of these transistors $T_1$ and $T_2$ are shunted by two capacitors $C_1$ and $C_2$. The base of transistor $T_2$ is connected to ground potential, while the base of transistor $T_1$ is connected to a control input 8 of the element 2. Each control input 8 of the elements 2 is connected to a clock input 5 of the shift register.

A common signal $\phi$ consisting of a symmetrical square wave voltage is applied to this clock input 5. During the positive half-cycle of said square wave voltage transistor $T_1$ is conducting and the capacitor $C_1$, which until this instant was fully charged, discharges via said transistor $T_1$ into the second capacitor of the preceding element, until said second capacitor is fully charged. The information, i.e. the charge complement, is thus transferred from this second capacitor of the preceding element to the capacitor $C_1$ of the shown element 2. During the next negative half-cycle of the square-wave voltage $\phi$ transistor $T_2$ is conducting so that capacitor $C_2$ then discharges via this transistor $T_2$ into $C_1$, as a result of which the information is transferred from $C_1$ to $C_2$. Accordingly, charge transfer takes place in the shift register from right to left, whereas the information in the form of a charge complement is shifted from left to right at a rate which is determined by the frequency of the clock signal $\phi$.

Shift registers are also known in which instead of a clock signal consisting of one pulse train a clock signal is used which consists of several pulse trains, each of the pulse trains being applied to a separate control input of the elements. Thus, a better efficiency can be obtained, without substantially altering the operation of the shift register.

FIG. 2 shows a spectrum of a video signal as it is recorded on the record carrier in a number of recording devices, the relevant recording method being described in the Netherlands Patent Application 7,009,602 laid open for public inspection. According to this recording method the luminanace signal is frequency modulated in the usual manner. The chrominance signal, however, is mixed with a reference frequency such that an amplitude and phase modulated carrier wave of approximately 0.5 MHz is obtained. Said reference frequency can be obtained by mixing the chrominance carrier with a frequency derived from the line frequency by multiplication. It is also possible to make use of a separate pilot tone as is also described in said Netherlands Patent Application.

Eventually the color video signal is recorded on the record carrier with a spectrum as shown in FIG. 2, in which the chrominance signal $E_c$ with the carrier wave $F_c$ is contained in the lower frequency band up to approximately 1 MHz in amplitude and phase modulated form, while the luminance signal $E_y$ with the carrier wave $F_y$ in frequency modulated form covers the frequency band 1 – 6 MHz. It is obvious that for recording only a band of approximately 4 MHz is required because a single side band of the frequency modulated luminance signal may suffice, as is indicated by a dotted line. If during reproduction this signal is supplied to an analogue shift register the minimum permissible clock frequency will consequently be approximately 8 MHz.

FIG. 3 shows a first embodiment of the device according to the invention. The video signal E which, for example, has a spectrum as shown in FIG. 2, is applied to a separator stage S, in which the luminance signal $E_y$ and the chrominance signal $E_c$ are extracted from the composite color video signal E. The luminance signal $E_y$ is applied to a transformation stage $O_1$, generally a demodulator, in which the signal is transformed to a lower frequency. When using a demodulator this automatically results in a spectrum of only half the bandwidth as compared with the original double side-band signal, so that the transformed luminance signal $E_y'$ generally will have a spectrum as shown in FIG. 5.

The chrominance signal $E_c'$, obtained from the separator stage S, which has a spectrum as shown in FIG. 4 (fully in accordance with FIG. 2), and the luminance signal $E_y'$ obtained from the transformation stage D are each individually applied to two identical shift registers 11 and 12. These two shift registers 11 and 12 receive the same clock signal $\phi$ at their respective clock inputs 13 and 14 via a common terminal 15, so that the two signal components $E_c$ and $E_y'$ always have the same mutual delay. The outputs of the two shift registers 11 and 12 are connected to a combination stage 0 in which, for example, by re-transformation of the luminance signal $E_y'$, again a video signal $E_o$ with the original spectrum of FIG. 2 is obtained, which signal $E_o$ is then of course delayed relative to the signal E. If desired, the signals $E_c$ and $E_y'$ may be combined in such a way that directly a color video signal according to the PAL or NTSC system is obtained.

The advantage of the device according to the invention is that a smaller number of elements is required for each shift register, because the minimum permissible clock frequency is smaller than when a single delay line is used. The minimum permissible clock frequency for the device is determined by the maximum frequency of the transformed luminance signal $E_y'$ (see FIG. 5). When allowance is made for a certain margin, a maximum frequency of 3 MHz may be assumed, which implies that the minimum permissible clock frequency is now 6 MHz as compared with 8 MHz in the known device. As a result, the attainable frequency sweep is increased and consequently the number of elements of each shift register required for a certain maximum timing error compensation may be reduced, so that the signal attenuation is reduced.

A further reduction of the total number of elements required is achieved in a preferred embodiment of the device according to the invention as shown in FIG. 6. Here it is assumed that the chrominance and luminance information have already been extracted and that the luminance information $E_y$ has already been transformed to lower frequencies, i.e. it is supposed that the signals $E_c$ and $E_y'$ again have the spectrums of FIGS. 4 and 5. These two signals $E_c$ and $E_y'$ are applied to two shift registers 11 and 12, whose outputs are connected to a combining stage O, from which the combined signal $E_o$ can be taken.

The two shift registers 11 and 12, however, are not identical in this case but possess a different number of elements, i.e. shift register 11 has fewer elements than shift register 12. Furthermore, these shift registers no longer receive the same clock signal but shift register 11 receives a clock signal whose frequency is lower by a fixed factor than the frequency of the clock signal applied to shift register 12. This is realized in a simple manner by deriving the clock signal for the shift register 11 via a divider stage Q from the clock signal $\phi$ for the shift register 12 which is applied to the common terminal 15. The divisor $p$ of the divider stage Q is then selected so that it equals the quotient of the number of elements of the two shift registers, which ensures that the two signal components $E_c$ and $E_y'$ are subject to the same mutual delay.

This reduction of the clock frequency for the shift register 11 is permissible, because the chrominance signal $E_c$ has a smaller bandwidth than the luminance signal $E_y'$. It can be seen in FIG. 4 that for the chrominance signal a minimum clock frequency of approximately 2 MHz is permissible. This means that for the divisor $p$ of the divider stage Q a factor of 3 may be selected, which also implies that the number of elements of the shift register 11 is reduced by a factor of 3 with respect to the number of elements of the shift register 12, so that an appreciable reduction is achieved.

It will be obvious that in the case of a different spectrum of the color video signal, i.e. with different recording methods, a different divisor $p$ should or may be chosen and that the invention is not at all limited to an application with the indicated spectrum of the color video signal.

For clarity FIG. 6 schematically shows in which manner the clock signal $\phi$ can be supplied by a voltage-controlled oscillator VCO, so that the frequency of the clock signal is determined by the magnitude of a control signal V which is fed to the control input of the oscillator. This control signal V is obtained with the aid of a comparator circuit R and is a measure of the timing error between a measurement signal F and a frequency signal $F_{ref}$. This measurement signal F is a signal which is in synchronism with the color video signal and may, for example, be a synchronizing signal which is additionally recorded on the tape, but the field or line synchronizing pulse train present in the video signal may just as well be used for this purpose. The reference signal $F_{ref}$ may, of course, be derived from an external source but may also be generated by a stable oscillator included in the recording equipment.

What is claimed is:

1. A device for the compensation of timing errors in a color video signal which is derived from a record carrier, specifically a color video signal whose chrominance information and luminance information are recorded on the record carrier in two different frequency bands, the device comprising a variable delay line which consists of a shift register, the shift register comprising a group of series-connected elements, the transfer of information from one element to the next being controlled by a variable frequency clock signal which is applied to a clock input of the shift register and whose frequency is determined by a control signal, which is obtained by comparing a synchronizing signal which is in synchronism with the color video signal and a reference signal, the improvement wherein the device comprises a first and a second shift register, means for transforming the information in the upper one of the two frequency bands to a lower frequency band means for applying the chrominance information to the first shift register, means for applying the luminance information to the second shift register, and means for deriving the clock signals for the two shift registers from said control signal.

2. A device as claimed in claim 1, wherein the number of elements of the first shift register is smaller than the number of elements of the second shift register and further comprising divider means for deriving the clock signal for the first shift register from the clock signal for the second shift register, the divisor of said divider means being equal to the quotient of the number of elements of the two shift registers.

3. A device as claimed in claim 2, wherein the divsor at least substantially equals the quotient of the minimum widths required for the frequency bands of the luminance information and the chrominance information.

4. A device as claimed in claim 1, wherein each of said first and second shift registers comprise a plurality of series connected charge storage register stages, means for charging a first of said stages of said first shift register with said chrominance information, means for shifting said charge serially along said stages of said first shift register, means for charging a first of said stages of said second charge storage register with said luminance information, and means for shifting said charge serially along said stages of said second charge storage register.

* * * * *

PO-1050
(5/69)

UNITED STATES PATENT OFFICE
CERTIFICATE OF CORRECTION

Patent No. 3,879,748 Dated April 22, 1975

Inventor(s) JACOB DE BOER

It is certified that error appears in the above-identified patent and that said Letters Patent are hereby corrected as shown below:

IN THE SPECIFICATION

Col. 4, line 45, "$O_1$" should be --$D_1$--;

IN THE CLAIMS

Claim 1, line 17, after "information" should be --contained--;

line 18, after "band" should be -- , --;

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*